United States Patent
Silberstein et al.

(10) Patent No.: US 11,039,364 B2
(45) Date of Patent: Jun. 15, 2021

(54) METHODS AND APPARATUS FOR PROACTIVELY SWITCHING BETWEEN AVAILABLE NETWORKS

(71) Applicant: Google LLC, Mountain View, CA (US)

(72) Inventors: Rebecca Silberstein, Sunnyvale, CA (US); Michael Plass, Mountain View, CA (US); Ning Zhang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 3 days.

(21) Appl. No.: 16/145,564

(22) Filed: Sep. 28, 2018

(65) Prior Publication Data

US 2020/0107238 A1      Apr. 2, 2020

(51) Int. Cl.
| | |
|---|---|
| *H04W 36/30* | (2009.01) |
| *H04B 17/318* | (2015.01) |
| *H04B 17/373* | (2015.01) |
| *H04W 36/00* | (2009.01) |
| *H04L 12/26* | (2006.01) |

(52) U.S. Cl.
CPC .......... *H04W 36/30* (2013.01); *H04B 17/318* (2015.01); *H04B 17/373* (2015.01); *H04L 43/0829* (2013.01); *H04W 36/0069* (2018.08)

(58) Field of Classification Search
None
See application file for complete search history.

(56) References Cited

U.S. PATENT DOCUMENTS

| | | |
|---|---|---|
| 7,808,900 B2 | 10/2010 | Suh |
| 7,809,360 B2 | 10/2010 | Agrawal et al. |
| 8,078,171 B2 | 12/2011 | Taaghol et al. |

(Continued)

FOREIGN PATENT DOCUMENTS

| | | |
|---|---|---|
| EP | 1206069 A1 | 5/2002 |
| EP | 1885144 | 2/2008 |

(Continued)

OTHER PUBLICATIONS

"Extended Gradient Predictor and Filter for smoothing RSSI" by Subhan (Year: 2014).*

(Continued)

*Primary Examiner* — Noel R Beharry
*Assistant Examiner* — Pamit Kaur
(74) *Attorney, Agent, or Firm* — Honigman LLP; Brett A. Krueger

(57) ABSTRACT

Methods and apparatus allow a mobile device to proactively switch to a new network by using quality of connection information and the rate of change of the received signal strength indication (RSSI) to proactively switch from a first network, such as a WiFi network, to the new network, such as another WiFi network or a cellular network. For example, the mobile device determines a rate of change of the RSSI for the first network. Based on the rate of change of the RSSI, the mobile device predicts when the RSSI of the network is beyond a quality threshold. Based on the prediction, the mobile device switches from the first network to a second network. In another example, the method and device uses a quality of connection of the first network connection to determine when to switch from a first network connection to a second network connection.

31 Claims, 11 Drawing Sheets

(56) References Cited

U.S. PATENT DOCUMENTS

| | | | |
|---|---|---|---|
| 8,391,192 | B2 | 3/2013 | Prakash et al. |
| 8,437,307 | B2* | 5/2013 | Chaturvedi ....... H04W 36/0011 |
| | | | 370/331 |
| 8,484,568 | B2 | 7/2013 | Rados et al. |
| 8,590,023 | B2 | 11/2013 | Gupta et al. |
| 8,767,695 | B2 | 7/2014 | Sheriff et al. |
| 8,824,989 | B2 | 9/2014 | Jackson et al. |
| 9,014,147 | B1 | 4/2015 | White et al. |
| 9,369,936 | B2* | 6/2016 | Chin ..................... H04W 36/30 |
| 9,507,008 | B1* | 11/2016 | Thiagarajan ............ G01S 5/021 |
| 9,774,522 | B2 | 9/2017 | Vasseur et al. |
| 9,918,264 | B1* | 3/2018 | Bitra ..................... H04W 64/00 |
| 2002/0169716 | A1 | 11/2002 | Johnson et al. |
| 2003/0231589 | A1 | 12/2003 | Itoh et al. |
| 2004/0246920 | A1 | 12/2004 | Savolainen |
| 2005/0226196 | A1 | 10/2005 | Suh |
| 2007/0037550 | A1 | 2/2007 | Armstrong et al. |
| 2007/0076664 | A1 | 4/2007 | An et al. |
| 2007/0147317 | A1 | 6/2007 | Smith et al. |
| 2008/0009279 | A1 | 1/2008 | Sakawa |
| 2008/0096560 | A1 | 4/2008 | Felske et al. |
| 2008/0107051 | A1 | 5/2008 | Chen et al. |
| 2008/0137537 | A1 | 6/2008 | Al-Manthari et al. |
| 2008/0186917 | A1 | 8/2008 | Wu et al. |
| 2009/0061862 | A1 | 3/2009 | Alberth, Jr. et al. |
| 2009/0298467 | A1 | 12/2009 | Zohar |
| 2010/0304737 | A1 | 12/2010 | Jain et al. |
| 2011/0085518 | A1 | 4/2011 | Taaghol et al. |
| 2011/0096673 | A1 | 4/2011 | Stevenson et al. |
| 2011/0170450 | A1 | 7/2011 | Juntti et al. |
| 2011/0306318 | A1 | 12/2011 | Rodgers et al. |
| 2012/0014271 | A1 | 1/2012 | Damenti |
| 2012/0052914 | A1 | 3/2012 | Yaqub et al. |
| 2012/0094653 | A1 | 4/2012 | Okuda |
| 2012/0195223 | A1 | 8/2012 | Raleigh |
| 2012/0196644 | A1* | 8/2012 | Scherzer ............... H04W 48/18 |
| | | | 455/524 |
| 2012/0282915 | A1 | 11/2012 | Haynes et al. |
| 2012/0314607 | A1* | 12/2012 | Craig .................. H04W 52/241 |
| | | | 370/252 |
| 2013/0035115 | A1 | 2/2013 | Lindegren et al. |
| 2013/0040693 | A1 | 2/2013 | Chen et al. |
| 2013/0148567 | A1 | 6/2013 | Efrati et al. |
| 2013/0155842 | A1 | 6/2013 | Moore et al. |
| 2013/0203438 | A1 | 8/2013 | Shin |
| 2014/0003342 | A1 | 1/2014 | Sheriff et al. |
| 2015/0098393 | A1 | 4/2015 | Tofighbakhsh et al. |
| 2015/0127939 | A1 | 5/2015 | Mazandarany et al. |
| 2015/0141037 | A1 | 5/2015 | Saha et al. |
| 2015/0172941 | A1* | 6/2015 | Agarwal ............... H04W 24/08 |
| | | | 370/253 |
| 2015/0281198 | A1 | 10/2015 | Lee et al. |
| 2015/0350875 | A1* | 12/2015 | Chhabra ........... H04W 36/0083 |
| | | | 455/432.1 |
| 2015/0350986 | A1* | 12/2015 | Wigren ................. H04W 36/18 |
| | | | 370/332 |
| 2016/0037340 | A1 | 2/2016 | Rayment et al. |
| 2016/0261596 | A1 | 9/2016 | Khello et al. |
| 2017/0289788 | A1 | 10/2017 | Lalweney |

FOREIGN PATENT DOCUMENTS

| | | |
|---|---|---|
| EP | 2244502 A1 | 10/2010 |
| WO | 00/38446 | 6/2000 |
| WO | 2002-041580 | 5/2002 |
| WO | 2004-047476 | 6/2004 |
| WO | 2006-005947 | 1/2006 |
| WO | 2008-060464 | 5/2008 |
| WO | 2011-162688 | 12/2011 |
| WO | 2014-011094 | 1/2014 |
| WO | 2015-158263 | 10/2015 |

OTHER PUBLICATIONS

Handover Triggering in IEEE 802.11 Networks by Montavont, hereafter referred as Montavont. (Year: 2018).*
Handover Triggering in IEEE 802.11 Networks by Montavont (Year: 2018).*
Zhang, Yanfeng et al.; LeapFrog: Fast, Timely WiFi Handoff; Nov. 26-30, 2007.
European Patent Office; International Search Report and Written Opinion; Application No. PCT/US2013/047946; dated Dec. 17, 2013.
Zhu and Corson, "QoS routing for mobile ad hoc networks," In Proceedings of ICC, Jun. 2002, 12 pages.
Aguayo et al., "Link-Level Measurements from an 802.11b Mesh Network," In Proceedings of SIGCOMM, Aug. 2004, 11 pages.
Ahn et al., "Supporting Service Differentiation for Real-Time and Best-Effort Traffic in Stateless Wireless Ad Hoc Networks (SWAN)," IEEE Transactions on Mobile Computing, Jul. 2002, 1(3):192-207.
AppleInsider,' [online]. "Apple's 'Wi-Fi Cellular' option is iOS 6 to keep apps syncing when WiFi networks choke," 2012, [retrieved on Aug. 20, 2012]. Retrieved from the Internet: URL:http://www.appleinsider.com/articles/12/08/09/apples-wi-fi-plus-celluar-option-in-ios-6-to-keep-apps-syncing-when-wifi-networks 2 pages.
Bicket, "Bit-rate Selection in Wireless Networks," Master's thesis, Massachusetts Institute of Technology, 2005, 50 pages.
Chakeres, and Belding-Royer. "PAC: Perceptive Admission Control for Mobile Wireless Networks," In Proceedings of QShine, Oct. 2004, 18-26.
Chen and Heinzelman, "QoS-aware routing based on bandwidth estimation for mobile ad hoc networks," IEEE JSAC, Mar. 2005, 23(3):561-572.
Chen et al., "QoS Routing Performance in Multihop, Multimedia, Wireless Networks," In Proceedings of IEEE International Conference on Universal Personal Communications, Jun. 1997, 5 pages.
De Couto et al., "A High-Throughput Path Metric for Multi-hop Wireless Routing," In Proceedings of MobiCom, Oct. 2003, 11:419-434.
Draves et al., "Comparison of Routing Metrics for Static Multi-Hop Wireless Networks," In ACM International Conference on Special Interest Group on Data Communication, Mar. 2004, 12 pages.
Draves et al., "Routing in Multi-radio, Multi-hop Wireless Mesh Networks," In Proceedings of MobiCom, Sep. 2004, 15 pages.
Gupta and Kumar, "The capacity of wireless networks," IEEE Transactions on Information Theory IT, Mar. 2000, 46(2):388-404.
Henderson et al., "The Changing Usage of a Mature Campus-wide Wireless Network," In Proceedings of MobiCom, Sep. 2004, 21 pages.
Jardosh et al., "IQU: Practical Queue-Based User Association Management for WLANs," In Proceedings of MobiCom, Sep. 2006, 12 pages.
Lee et al.' "INSIGNIA: An IP-Based Quality of Service Framework for Mobile ad Hoc Networks," Journal of Parallel and Distributed Computing, Apr. 2000, 60(4):68-76.
Lin and Liu, "QoS routing in ad hoc wireless networks," IEEE JSAC, Aug. 1999, 17(8):1426-1438.
Lin, "Admission Control in Time-Slotted Multihop Mobile Networks," IEEE JSAC, 19(10): 1974-1983, Oct. 2001.
Padhye et al., "Estimation of Link Interference in Static Multi-hop Wireless Networks," In Proceedings of Internet Measurement Conference, Oct. 2005, 6 pages.
Reis et al., "Measurement-Based Models of Delivery and Interference in Static Wireless Networks," In Proceedings of SIGCOMM, Sep. 2006, 12 pages.
Sheriff et al., "Measurement Driven Admission Control on Wireless Backhaul Networks," Computer Communications, May 2008, 31(7):1354-1371.
Wong et al., "Robust Rate Adaptation for 802.11 Wireless Networks," In Proceedings of MobiCom, Sep. 2006, 12 pages.
Wu et al., "SoftMAC: Layer 2.5 MAC for VoIP Support in Multi-hop Wireless Networks," In Proceedings of SECON, Sep. 2005, 11 pages.
Xia et al., "An Intelligent Vertical Handoff Algorithm in Heterogeneous Wireless Networks," 2008 International Conference on Neural Networks and Signal Processing, Jun. 7-11, 2008, 550-555.

(56) References Cited

OTHER PUBLICATIONS

Xu et al., "How effective is the IEEE 802.11 RTS/CTS handshake in ad hoc networks," In Proceedings IEEE GLOBECOM'02, Nov. 2002, 7 pages.
Xue and Ganz, "Ad hoc QoS on-demand routing (AQOR) in mobile ad hoc networks," Journal of Parallel and Distributed Computing, 2003, 63(2):154-165.
Yang and Kravets, "Contention-Aware Admission Control for Ad Hoc Networks," IEEE Transactions on Mobile Computing 4(4): 363-377, Jul./Aug. 2005.
Yang and Vaidya"On physical carrier sensing in wireless ad hoc networks," INFOCOM 2005. 24th Annual Joint Conference of the IEEE Computer and Communications Societies. Proceedings IEEE , vol. 4, pp. 2525-2535, Mar. 2005.
Zahran et al., "Signal Threshold Adaptation for Vertical Handoff in Heterogeneous Wireless Networks," IFIP Networking, May 2-6, 2005, 1-32.
Ericsson: "RAN-ANDSF Interwor", 3GPP Draft; R2-133440-WLAN 3GPP Radio Interworking—ANDSF Interworking, 3rd Generation Partnership Project (3GPP), Mobile Competence Centre; vol. RAN WG2; Sep. 27, 2013.
Ericsson et al.: "Analysis of WLAN-3GPP interworking solutions", 3GPP Draft; R2-131388—Analysis of WLAN 3GPP Interworking Solutions, 3rd Generation Partnership Project (3GPP), Mobile Competence Centre; vol. RAN WG2; Apr. 6, 2013.
Bircher et al., "An Agent-Based Architecture for Service Discovery and Negotiation in Wireless Networks," University of Bern, Wired/Wireless Internet Comms. (WWIC), Jan. 21, 2004.
Levy, Martyn, "Best-Practice Authentication Methods for Wi-Fi Offload," http://www.acurixnetworks.com/single-post/2013/05/20/BestPractice-Authentication-Methods-For-WiFi-Offload, May 20, 2013.
Silverman, Dwight, "Thinking of changing cellphone carriers? Check this app first," http://blog.chron.com/techblog/2011/06/thinking-of-changing-cellphone-carriers-check-this-app-first/, Houston Chronicle Techblog, Jun. 15, 2011.
Venkiteswaran, Sriram, "Google Project Fi—New Era for Mobile Technology?", http://blog.mojonetworks.com/google-project-fi-new-era-for-mobile-technology, MojoBlog, May 19, 2015.
VoLGA FORUM, "VoLGA Stage 2 V1.7.0: Voice over LTE via Generic Access," Jun. 14, 2010.
QUALCOMM Europe et al., "Text Proposal for UE Measurements for Minimizing Drive Tests," 3GPP TSG-RAN WG2 Meeting #66, R2-093175, May 4-8, 2009.
QUALCOMM Europe, "Framework for UE SON Reports," 3GPP TSG RAN WG3 & SA WG5, S5-090017, Jan. 12-13, 2008.
CMCC, "Network Selection for WLAN/3GPP Radio Interworking," 3GPP TSG-RAN WG2 Meeting 81#bis, R2-130973, Apr. 15-19, 2013.
Nikravesh et al., "Mobile Network Performance from User Devices: A Longitudinal, Multidimensional Analysis," Passive and Active Measurement: 15th International Conference, PAM 2014, Mar. 10-11, 2014.
Aptilo Inc.; "EAP-SIM and EAP-AKA authentication for mobile devices"; from https://web.archive.org/web/20160303105429/https://www.aptilo.com/aptilo-eap-sim-authentication-server/eap-sim-ada; Mar. 3, 2016.
Aptilo Inc.; "Innovative Wi-Fi Offload features"; from https://web.archive.org/web/20160303095650/https://www.aptilo.com/mobile-data-offloading/innovative-wifi-offload-features; Mar. 3, 2016.
Sensorly, "With Sensorly you can . . . " www.sensorly.com; accessed Apr. 21, 2016.
Movirtu, "Virtual SIM Platform: Decoupling the identity from the SIM card"; www.movirtu.com; accessed Mar. 22, 2016.
Alcatel Lucent; "7750 Service Router Mobile Offload"; Mar. 2016.

* cited by examiner

METHODS AND APPARATUS FOR PROACTIVELY SWITCHING BETWEEN AVAILABLE NETWORKS

BACKGROUND OF THE DISCLOSURE

Internet connectivity is one of the most important functions of a mobile device (e.g., a smartphone, wearable, tablet or other wireless mobile device). Often, multiple different network connections (e.g., cellular network connections and/or wireless network connections) are available to the mobile device. However, a device may need to switch to a cellular network connection or another wireless network connection if the current wireless network connection falters. For example, after a mobile device connects to the Internet via a first wireless network connection, a user may physically move the mobile device and/or the access point (AP) providing the first wireless network connection to a new location (e.g., the user may move from his or her office to his or her car). As the distance increases between the mobile device and the AP, the reliability of the first network connection may decrease. Eventually, when the distance is too great, the mobile device might not be able to access the Internet using the first network connection, and may switch to a second network connection (e.g., a second wireless network provided by a second AP and/or a cellular network). However, the device may switch to the second network connection too late, causing poor internet connection for the device and/or the device to lose complete network connectivity for a period of time. Additionally, and/or alternatively, the device may switch to the second network too early, which causes thrashing between the network types. Accordingly, there exists a need for one or more improved methods and/or devices to address one or more above-noted drawbacks.

SUMMARY OF THE DISCLOSURE

Briefly, to prevent the loss of network connectivity, the method and system described below uses factors to predict when the mobile device will lose and/or receive poor network connectivity, and proactively switch to a new network connection (e.g., a new cellular network and/or other type of wireless network). As explained below, by using the mobile device to proactively switch to a new network, poor and/or loss of network connectivity can be reduced. Furthermore, by the mobile device performing the methods below, the mobile device is not creating an additional network load for the communication network.

In some examples, the mobile device uses an obtained received signal strength indication (RSSI) information from the first wireless network to switch between network connections. For instance, the mobile device determines a rate of change of the RSSI for the first network. Based on the rate of change of the RSSI, the mobile device predicts when the RSSI of the network is beyond a quality threshold. Based on the prediction, the mobile device switches from the first network to a second network. In some examples, the mobile device uses a Kalman filter to predict when the RSSI of the network is beyond the quality threshold, and proactively switches to a new network connection.

In some implementations, the method and device uses the RSSI rate of change and a quality of the connection of the first network connection to determine when to switch from a first network connection to a second network connection. For example, the device uses the RSSI velocity as explained above. Further, the device determines the quality of connection based on a number of successful and/or failed packet transmissions with the first network. Additionally, and/or alternatively, the device determines the quality of connection based on a number of successful packet receptions and/or a ratio of data moved versus data stuck/stalled from the first network.

BRIEF DESCRIPTION OF THE DRAWINGS

The disclosure will be more readily understood in view of the following description when accompanied by the below figures and wherein like reference numerals represent like elements, wherein.

DETAILED DESCRIPTION OF EMBODIMENTS

Exemplary embodiments provide a technical solution that addresses the problem of having poor connections or switching connections too late. As used herein, a mobile device includes any mobile apparatus, system, and/or device that is able to connect to the Internet (e.g., the World Wide Web) via one or more network connections. For example, the mobile device can be, but is not limited to, smartphones, smartwatches, personal digital assistants (PDAs), tablet devices, other handheld or portable electronic devices, MP 3 players, battery-powered devices, wearable devices, radios, navigation devices, laptop or note computers, DVRs (digital video recorders), gaming devices, cameras, netbooks, e-readers, navigation devices with video capable screens, and/or other mobile devices.

Figure 1:
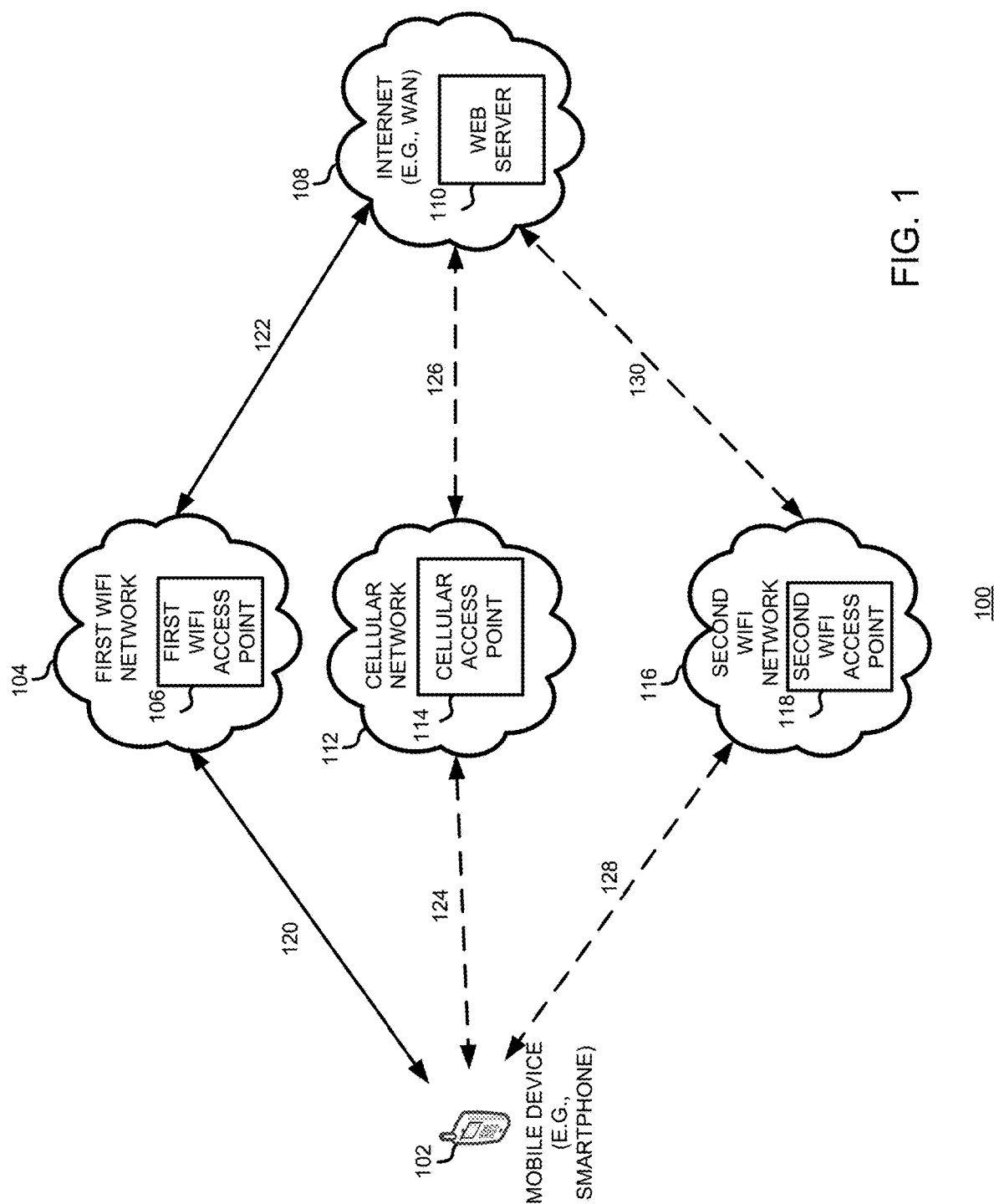
FIG. 1 is a block diagram illustrating one example of a communication system for proactively switching to a new network connection in accordance with one example set forth in the disclosure.

FIG. 1 illustrates one example of a communication system 100 for proactively switching to a new network connection. The communication system 100 includes at least one mobile device 102, and the mobile device 102 communicates with (e.g., connect to) the Internet 108 via one or more network connections and/or communication networks. In other words, the mobile device 102 transmits (e.g., provides and/or sends) information to a server, such as a web server 110 (e.g., a server that supports internet protocols or otherwise is capable of interaction with the Internet 108 and/or the World Wide Web). Further, the mobile device 102 receives (e.g., obtain) information from the web server 110.

The mobile device 102 communicates (e.g., receive and transmit information) with the Internet 108 (e.g., web server 110) via multiple different network connections and/or communication networks. For example, the mobile device 102 connects to the Internet 108 via a WiFi network (e.g., a first WiFi network 104 and/or a second WiFi network 116) and/or via a cellular network (e.g., a cellular network 112).

The WiFi networks 104 and/or 116 is any wireless local area network (WLAN) operating under the various IEEE 802.11 standards, or any other kind of wireless network. Further, the WiFi networks 104 and/or 116 also includes at least one WiFi access point (AP) (e.g., first WiFi AP 106 and/or second WiFi AP 118). The WiFi APs 106 and 118 includes any suitable device, apparatus, and/or system (e.g., a mesh network system) capable of providing WiFi connectivity to the WiFi networks 104 and/or 116. In some examples, the WiFi AP 106 and/or 118 can also be hot spots serving as publicly accessible wireless internet connection transceivers, such as are found in public or semi-public venues (e.g., malls, restaurants, stores, hotels, commercial buildings, doctor's offices). In some instances, the WiFi networks 104 and/or 116 can be provided by other mobile devices, such as hotspot/tethering on another mobile device. In some variations, the WiFi networks 104 and/or 116 can be provided by transportation services (e.g., trains, planes, buses).

The cellular network 112 includes one or more cellular APs 114, such as one or more cell towers. The cellular network 112 can be any type of cellular network, including a second-generation (2G) cellular network, a third generation (3G) cellular network, a fourth generation (4G) or long term evolution (LTE) cellular network, a fifth generation (5G) cellular network, etc.

Although only three network connections and/or communication networks are shown, it should be understood that this is only for simplicity of illustration and, in practice, there may be more or less than three communication networks and/or network connections that the mobile device 102 can use to connect to the Internet 108. For example, the mobile device 102 can connect to a third WiFi network and/or another cellular network (e.g., the first cellular network 112 is a 4G cellular network and the second cellular network is a 3G cellular network). Additionally, and/or alternatively, although only one AP (e.g., first WiFi AP 106) is shown for each network, it should be understood that this is only for simplicity of illustration, and multiple APs can be used to connect to a network (e.g., first WiFi Network 104).

Although only a single web server 110 is shown in FIG. 1, it should be understood that this is only for simplicity of illustration and, in practice, the mobile device 102 can often be in communication (simultaneously or substantially simultaneously, or at different times) with multiple web servers rather than just a single web server by way of the multiple communication networks, such as the WiFi networks 104, 116 and/or the cellular network 112. It should further be understood that, while in the present embodiment, the mobile device 102 is shown to be in communication with the web server 110 (or multiple web servers), depending upon the embodiment, the mobile device 102 may also be in communication with one or more other types of servers (e.g., servers that are not web-based, that is, do not engage in communications via the World Wide Web) or other devices that are not servers. That is, FIG. 1 should be understood to represent on a most general level wireless communication between a mobile device 102 and any arbitrary number of any arbitrary type(s) of devices.

The communication links 120, 124, 128 are representative of wireless signals transmitted through the air/atmosphere between the mobile device 102, the cellular AP 114, the first WiFi AP 106, and the second WiFi AP 118. Further, the communication links 122, 126, and 130 are represented of any variety of types of communication paths between the cellular AP 114, the first WiFi AP 106, and the second WiFi AP 118, and the web server 110. Thus, depending upon the embodiment, the communication links 122, 126, and 130 can each include one or more wired and/or wireless communication pathways, for example, landline (e.g., fiber optic, copper) wiring, microwave communication, radio channel, wireless path, intranet, internet, and/or World Wide Web communication pathways (which themselves can employ numerous intermediary hardware and/or software devices including, for example, numerous routers, etc.).

In addition, a variety of communication protocols and methodologies can be used to conduct web-based communications via the communication links (e.g., network connections) 120, 122, 124, 126, 128, and/or 130 between the mobile device 102 and web server 110, including for example, transmission control protocol/internet protocol (TCP/IP), extensible messaging and presence protocol (XMPP), file transfer protocol (FTP), etc. In some examples, other types of protocols or communications techniques can be utilized to achieve web-based and/or internet-type communications.

Figure 2:
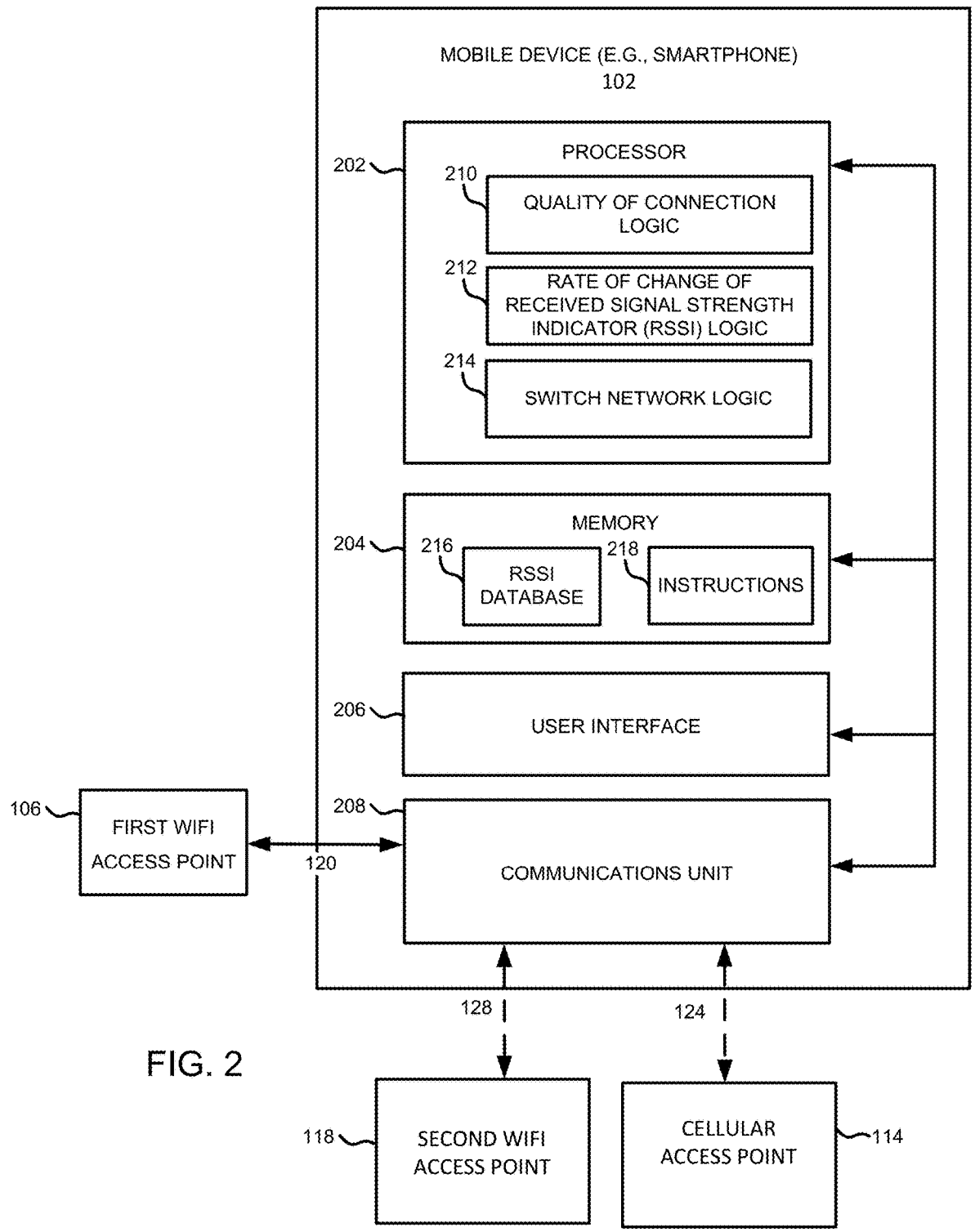
FIG. 2 is another block diagram illustrating one example of a communication system for proactively switching to a new network connection in accordance with one example set forth in the disclosure.

FIG. 2 illustrates a more detailed functional block diagram of the communication system 100. For example, FIG. 2 shows a mobile device 102 including a processor 202, memory 204, user interface 206, and/or a communications unit 208. In some examples, the processor 202 is a single processor. In other examples, the processor 202 may have two or more processors carrying out all processing required for the operation of the mobile device 102. The processor 202 includes quality of connection logic 210, rate of change of the received signal strength indicator (RSSI) logic 212, and switch network logic 214. During operation, the quality of connection logic 210 determines the quality of connection of a network connection and/or communication network (e.g., a first WiFi network 104, a cellular network 112, and/or a second WiFi network 116). The rate of change of RSSI logic 212 determines an RSSI of a network connection and/or a communication network. The switch network logic 214 obtains (e.g., receives) information from the quality of connection logic 210 and/or the rate of change of RSSI logic 212. Based on the information, the switch network logic 214 switches from a first network, such as the first WiFi network 104 provided by the first WiFi AP 106, to a second network. The second network is another WiFi network (e.g., WiFi Network 116) and/or a cellular network (e.g., cellular network 112). The quality of connection logic 210, the rate of change of the received signal strength indicator (RSSI) logic 212, and the switch network logic 214 will be described in further detail below.

The memory 204 includes read only memory (ROM), random access memory (RAM), or any other suitable non-transitory memory that stores processor instructions and executable code modules for the operation of the mobile device 102. For example, the memory 204 includes a RSSI database 216 that stores various data used for the operation of the mobile device 102. The memory 204 also stores computer-executable instructions 218 that when executed, cause the processor 202 to implement aspects of embodiments of components discussed herein and/or to perform aspects of embodiments of methods and procedures discussed herein. While the memory 204 is shown in FIG. 2 as separate from the processor 202, in some variations, the memory 204 may be a part of the processor 202.

The user interface 206 is any type of interface that receives user input/commands and transmits the user input to one or more components and/or entities of the mobile device 102. The communications unit 208 allows the mobile device 102 to receive and transmit messages, information, and/or data with the first WiFi AP 106 of the first WiFi network 104, the second WiFi AP 118 of the second WiFi network 116, and/or the cellular AP 114 of the cellular network 112. Accordingly, while not shown in FIG. 2, the communications unit 208 may include various elements (e.g., antennas, receivers, transmitters, modulation/demodulation units, etc.) as known in the art.

Figure 3:
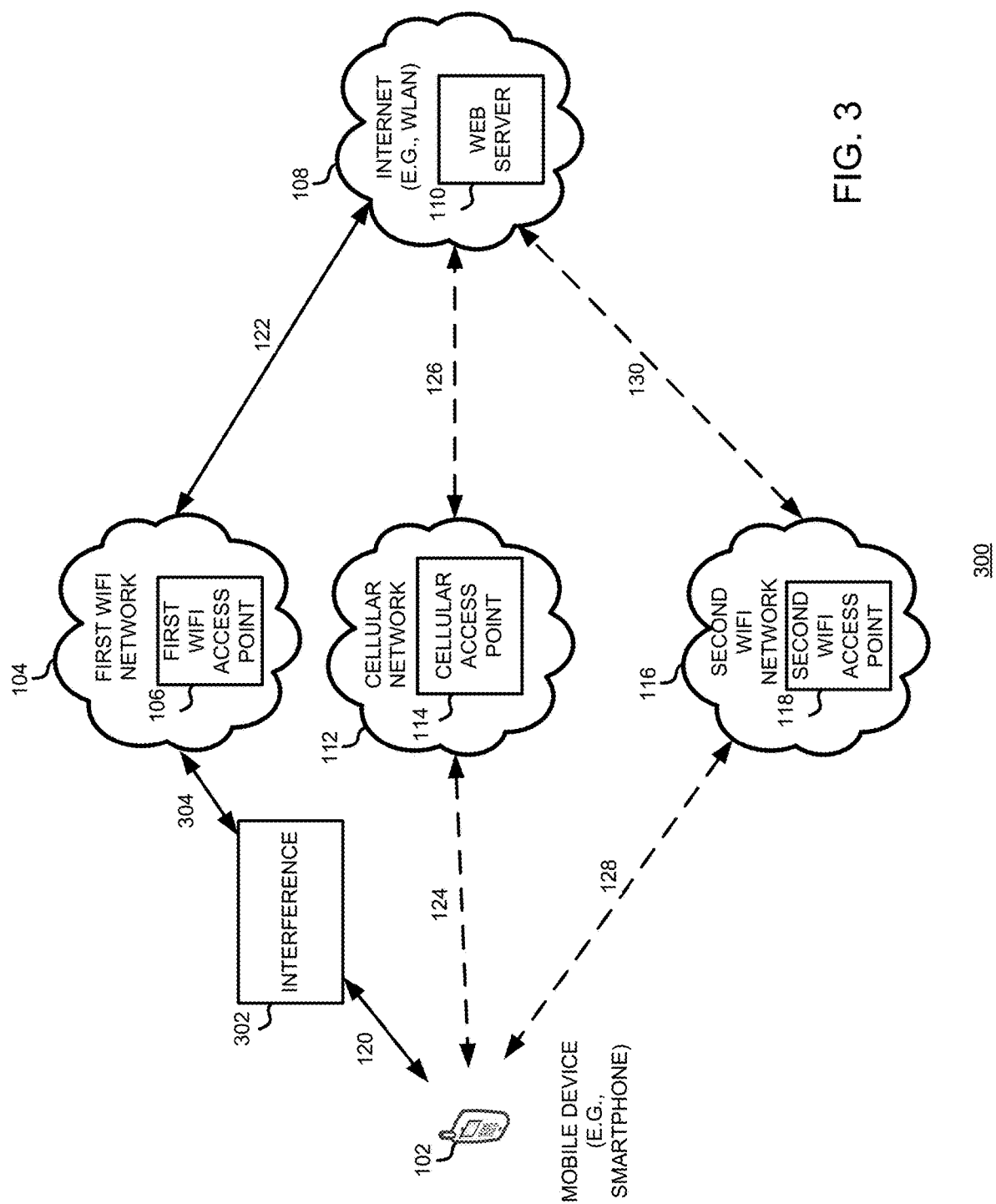
FIG. 3 is yet another block diagram illustrating one example of a communication system for proactively switching to a new network connection in accordance with one example set forth in the disclosure.

FIG. 3 illustrates another example of a communication system 300 for proactively switching to a new network connection. The communication system 300 includes the same devices, servers, APs, and/or networks as communication system 100 and also includes interference 302. The interference 302 is any interference (e.g., WiFi radio frequency interference and/or physical interference, such as a closed door) that causes the mobile device 102 to lose connectivity with the first WiFi network 104. For instance, the mobile device 102, via the user interface 206, receives user input indicating that the user wants to stream a particular movie. The web server 110 stores the movie. As such, the mobile device 102 transmits one or more data packets indicating a request for portions of the movie, and the data packets are routed to the web server 110 via the first WiFi AP 106. However, due to the interference 302, the first WiFi AP 106 is not able to receive the one or more data packets indicating the request. As such, the mobile device 102 is not be able to display the movie on the user interface.

Additionally, and/or alternatively, the mobile device 102 may have difficulty receiving information (e.g., data packets) from the first WiFi AP 106. For example, the web server 110 transmits data packets corresponding to the movie to the first WiFi AP 106, and the first WiFi AP 106 transmits the data packets to the mobile device 102. However, due to the interference 302, the mobile device 102 is not able to receive one or more of the data packets, causing the movie to pause or stall during playback.

Additionally, and/or alternatively, referring to FIG. 1 and even without the interference 302, the mobile device 102 may have difficulty connecting to the first WiFi network 104 and/or receiving and/or transmitting information to the first WiFi AP 106. For example, a user physically moves the mobile device 102 and/or first WiFi AP 106 to a new location (e.g., a user holding the mobile device 102 moves from his or her office to the parking lot). Due to the movement, the mobile device 102 begins within range of the first WiFi network 104, but eventually moves out of range of the first WiFi network 104. Additionally, and/or alternatively, in some instances, the mobile device 102 is stationary and the first WiFi AP 106 moves away from the mobile device 102 (e.g., the first WiFi AP 106 is on a vehicle that drives away from the mobile device 102). Similarly, due to the movement of the first WiFi AP 106, the mobile device 102 eventually moves out of range of the first WiFi network 104.

To prevent loss of Internet 108 connectivity and/or poor Internet 108 connectivity, the mobile device 102, using the quality of connection logic 210, the rate of change of RSSI logic 212, and/or the switch network logic 214, proactively switches from the first network (e.g., the first WiFi network 104) to a second network (e.g., the cellular network 112 and/or the second WiFi network 116). For example, the mobile device 102 predicts WiFi un-usability or degraded performance of the first WiFi network 104, and proactively switches to a different network. In some examples, this occurs prior to the mobile device 102 and/or user encounters a degraded performance and/or experience (e.g., before the movie stalls and/or stops during playback). Furthermore, similar prediction can be applied for usability (e.g., applied to the second network, such as the cellular network 112 and/or the second WiFi network 116). For example, based on the prediction, the mobile device 102 determines whether to switch to the second network and/or which network to switch to. This will be described in further detail in the methods and system described below.

Figure 4:
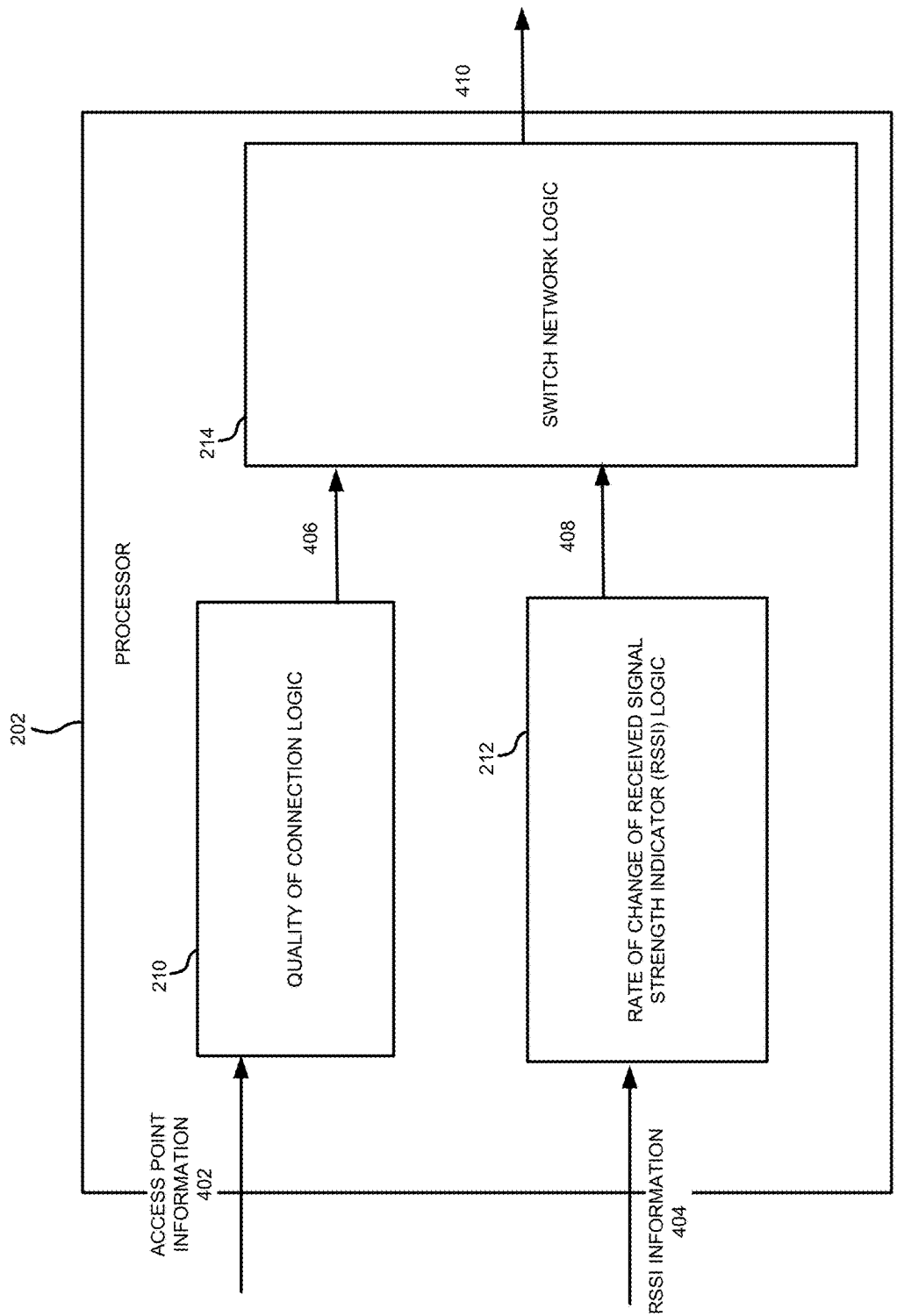
FIG. 4 is a block diagram illustrating a mobile device for proactively switching to a new network connection in accordance with one example set forth in the disclosure.
Figure 5:
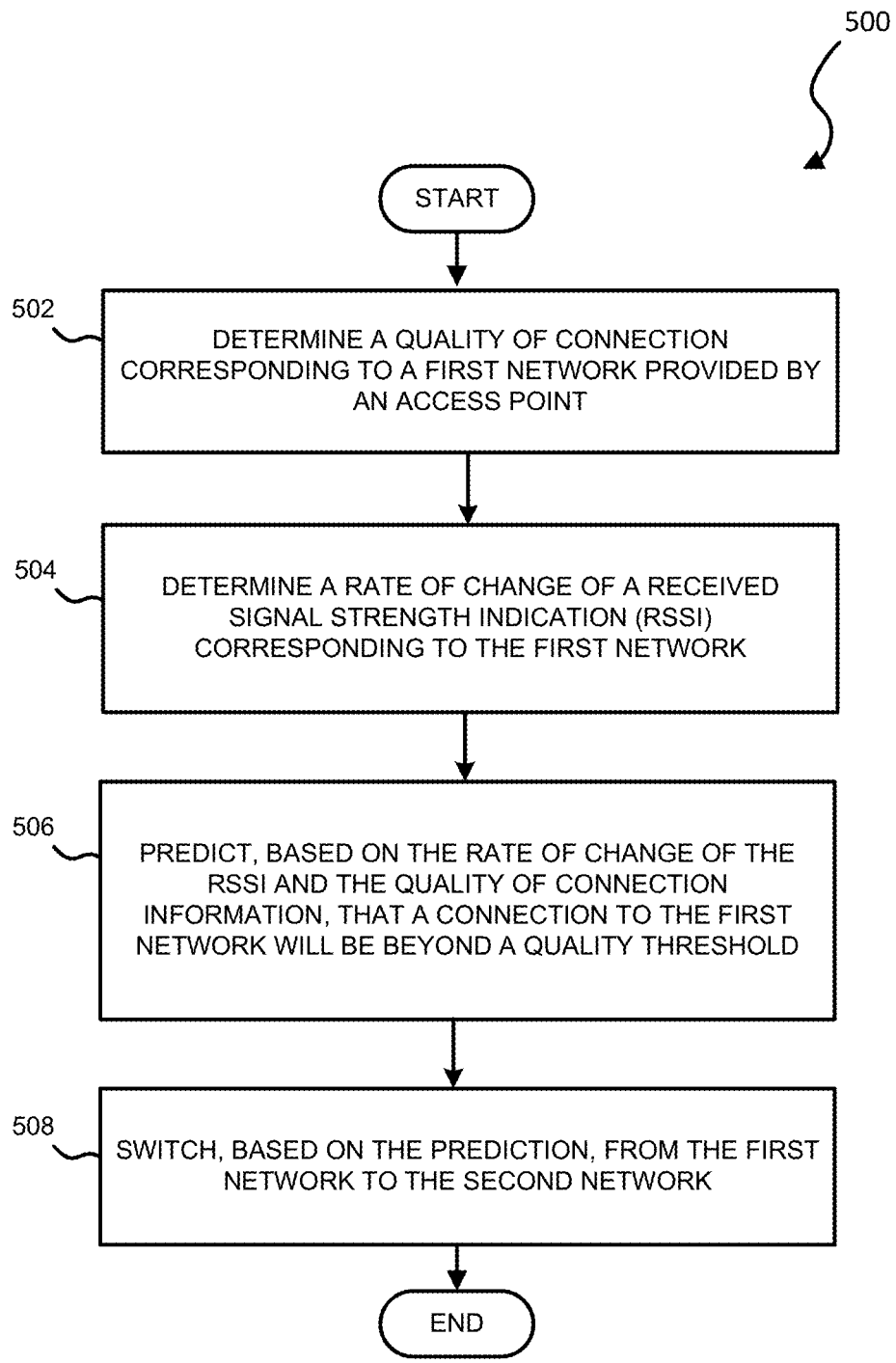
FIG. 5 is a flow chart illustrating one example of a method performed by a mobile device to proactively switch to a new network connection in accordance with one example set forth in the disclosure.

FIG. 4 is a more detailed block diagram illustrating the mobile device 102 that proactively switches to a new or second network. For example, FIG. 4 shows the processor 202 including the quality of connection (QOC) logic 210, the rate of change of RSSI logic 212, and the switch network logic 214. The following description is merely exemplary in nature and is in no way intended to limit the disclosure, its application, or uses. For example, as described below in FIGS. 6, 7, 8, and 9, multiple implementations of the logic 210, 212, and 214 and the method 500 may be used to proactively switch to a second network. As used herein in the specification (e.g., FIGS. 4, 6, and 8), the term "unit" or "logic" refers to, be part of, or include an Application Specific Integrated Circuit (ASIC), an electronic circuit, a processor or microprocessor (shared, dedicated, or group) or portion thereof and/or memory (shared, dedicated, or group) that executes one or more software or firmware programs, a combinational logic circuit, and/or other suitable components that provide the described functionality. Other implementation techniques are equally employed, such as programmable logic arrays and state machines. Thus, while this disclosure includes particular examples and arrangements of the units, the scope of the present system should not be so limited since other modifications will become apparent to the skilled practitioner. FIG. 4 will be described below with reference to FIG. 5. FIG. 5 illustrates an example method for the mobile device 102 to proactively switch to a second network.

In operation, at step 502, the quality of connection logic 210 determines a quality of connection with a first network provided by an AP, such as the first WiFi network 104 provided by the first WiFi AP 106. For example, the logic 210 obtains AP information 402 corresponding to an AP, such as the first WiFi AP 106. Based on the AP information 414, the logic 210 determines a quality of connection corresponding to the connection between the mobile device 102 and the first WiFi AP 106. For example, the quality of connection indicates a number of successful packet transmission from the mobile device 102 to the first WiFi AP 106, a number of failed packet transmissions from the mobile device 102 to the first WiFi AP 106, a number of successful packet receptions from the first WiFi AP 106 to the mobile device 102, retry counters corresponding to first WiFi AP 106 and the mobile device 102, and/or a ratio of data moved versus stalled and/or stuck between the first WiFi AP 106 and the mobile device 102.

In some examples, the logic 210 uses the quality of connection to determine whether data is flowing between the mobile device 102 and the first WiFi AP 106. For example, the logic 210 determines the quality of connection by checking outgoing buffers for connections on each network technology interface combined with the presence of retransmit timers and/or incoming data statistics to determine the quality of connection. Additionally, and/or alternatively, based on the quality of connection, the logic 210 determines whether data is flowing and/or the amount of data flowing between the mobile device 102 and the first WiFi AP 106. For example, the logic 210 determines whether the data is flowing (e.g., normal), acceptable (e.g., most of the data packets are being received/transmitted between the first WiFi AP 106 and the mobile device 102), barely (e.g., very few of the data packets are being received/transmitted between the first WiFi AP 106 and the mobile device 102), and/or not flowing (e.g., no data packets are being received/transmitted between the first WiFi AP 106 and the mobile device 102). The logic 210 provides (e.g., transmit and/or send) information 406 (e.g., the quality of connection and/or whether data is flowing) to the switch network logic 214.

At step 504, the rate of change (velocity) of RSSI logic 212 determines a rate of change (e.g., velocity) of a received signal strength indication (RSSI) corresponding to the first network (e.g., the first WiFi network 104). For example, the logic 212 obtains RSSI information 404 indicating current and/or previous RSSI values for the first WiFi AP 106. RSSI is a measurement (e.g., numerical value) of the power and/or signal strength present in a received signal from the first WiFi AP 106. The current RSSI value is the most recent RSSI value of a received signal from the first WiFi AP 106. The previous RSSI values are historical RSSI values of the first WiFi AP 106. For example, based on transmissions from the first WiFi AP 106, the mobile device 102 determines a WiFi signal strength, such as RSSI, at the location of the mobile device 102. The mobile device 102 stores the observed and/or measured RSSI in memory 204, such as in the RSSI database 216. The logic 212 obtains the current (e.g., most recent) RSSI for the first WiFi AP 106, and also obtains the previous RSSI of the first WiFi AP 106 from the RSSI database 216.

In some examples, the logic 212 determines (e.g., calculate) the velocity of the RSSI values corresponding to the first WiFi network 104 based on the difference between recent RSSI (e.g., current and/or previous RSSI) values. For example, as the mobile device 102 and/or first WiFi AP 106 physically move further apart, the RSSI received at the mobile device 102 decreases. The logic 212 determines the velocity of the RSSI values as the mobile device 102 and/or first AP 106 move apart.

In some variations, the logic 212 uses a weighted moving average of multiple RSSI values (e.g., current and multiple previous RSSI values) to determine a velocity of the RSSI for the first WiFi AP 106. In some instances, the logic 212 determines threshold velocity values, such as +/−0.2 as stationary, +/−1 as wandering, +/−4 as striding, and/or +/−10 as sprinting. A positive (+) indicates that the RSSI velocity is increasing between the current RSSI value minus the previous RSSI value, and a negative (−) indicates that the RSSI velocity is decreasing. Based on comparing the threshold velocity values to the velocity of the RSSI for the first WiFi AP 106, the logic 212 determines RSSI movement corresponding to the WiFi AP 106 (e.g., whether the mobile device 102 and/or WiFi AP 106 is stationary, wandering, striding, and/or sprinting).

At step 506, the switch network logic 214 predicts that a connection to the first network (e.g., a WiFi connection 120 between the mobile device 102 and the first WiFi AP 106) will be beyond a quality threshold based on the rate of change (velocity) of the RSSI and the quality of connection. For example, the logic 214 obtains information 406 (e.g., the quality of connection and/or whether data is flowing) and information 408 (e.g., the velocity of the RSSI values for the first WiFi network 104 and/or the RSSI movement). Based on information 406 and 408, the logic 214 predicts an instance of time in the future (e.g., 30 seconds in the future) that the connection between the first WiFi network 104 and the mobile device 102 will be beyond (e.g., above or below) a quality threshold. In some variations, predicting that a connection to the first network will be beyond the quality threshold indicates that at an instance of time in the future (e.g., 30 seconds in the future), the mobile device 102 might not able to connect to the web server 110 via the first WiFi Network 104. In other variations, predicting that a connection to the first network will be beyond the quality threshold indicates that the first WiFi Network 104 may provide a poor network connection to connect the mobile device 102 to the web server 110.

In some examples, the logic 214 uses whether data is flowing and/or the RSSI movement to determine whether the connection to the first network will be beyond the quality threshold. For example, the logic 214 determines the connection to the first network will be beyond the quality threshold if the connections established via the first WiFi AP 106 indicates that data is not flowing and the velocity is at a sprint (−10). Additionally, and/or alternatively, if the data flowing is acceptable and the RSSI movement is wandering, the logic 214 does not determine that the connection to the first network will be beyond the quality threshold. However, the logic 214 requests information 406 and 408 after a period of time (e.g., 15 seconds) since the connection may fail soon.

The below table shows one example of determining whether the connection to the first network will be beyond the quality threshold based on whether data is flowing (Yes, Acceptable, Barely, No) and the RSSI movement (Stationary, Wandering, Striding, Sprinting). However, the table below is merely one approach and many other approaches, including using different scores for each of the determinations of whether data is flowing and the RSSI movement can be used by the logic 214 to determine whether to switch to a second network.

| | | Rate of Change (Velocity) of RSSI | | | |
|---|---|---|---|---|---|
| | | STATIONARY | WANDERING | STRIDING | SPRINTING |
| Quality of | YES | 60+/− | 60+/− | 60+/53− | 60+/50− |
| Connection | ACCEPTABLE | 60+/− | 60+/53− | 53+/50− | 50−/0− |

| | | Rate of Change (Velocity) of RSSI | | | |
|---|---|---|---|---|---|
| | | STATIONARY | WANDERING | STRIDING | SPRINTING |
| (Data Flowing) | BARELY | 50+/− | 53+/50− | 50+/25− | 25+/0− |
| | NO | 0+/− | 0+/− | 25+/0− | 25+/0− |

Referring to the table above, in some examples, the quality threshold (e.g., score) is 50. Based on a score being 50 or lower (e.g., barely and stationary, barely and striding, acceptable and striding), the logic 214 predicts that the connection between the mobile device 102 and the first WiFi network 104 will have poor network connectivity and/or fail. The logic 214 predicts that the connection to the first network will not have poor network connectivity and/or fail if the score is higher than 50. Additionally, and/or alternatively, the logic 214 predicts the connection to the first network will have poor network connectivity and/or fail based on whether the velocity is positive and/or negative. For example, the logic 214 predicts that the connection will have poor network connectivity and/or fail if there is a negative (−) velocity that is barely and wandering, but the first network will not have poor network connectivity and/or fail if there is a positive (+) velocity that is wandering and barely.

At step 508, the switch network logic 214 switches from the first network to the second network based on the prediction that the connection to the first network will be beyond the quality threshold. For example, the switch network logic 214 switches the mobile device 102 from using the first WiFi AP 106 to communicate with the web server 110 to using a second WiFi AP 118 and/or a cellular AP 114 to communicate with the web server 110.

In some examples, switching from the first network to the second network is further based on usability of the second network (e.g., a prediction of whether the connection to the second network will be beyond the quality threshold). For example, the quality of connection logic 210 determines a quality of connection for the second network provided by a second access point (e.g., second WiFi AP 118 and/or cellular AP 114). Additionally, and/or alternatively, the rate of change of RSSI logic 212 determines a rate of change of the RSSI for the second network. Using the RSSI and the quality of connection for the second network, the switch network logic 214 predicts whether a connection to the second network will be beyond a quality threshold. In some examples, even if the connection to the first network will be beyond the quality threshold, the switch network logic 214 does not switch from the first network to the second network if the switch logic 214 determines that the connection to the second network will be beyond a quality threshold.

Figure 6:
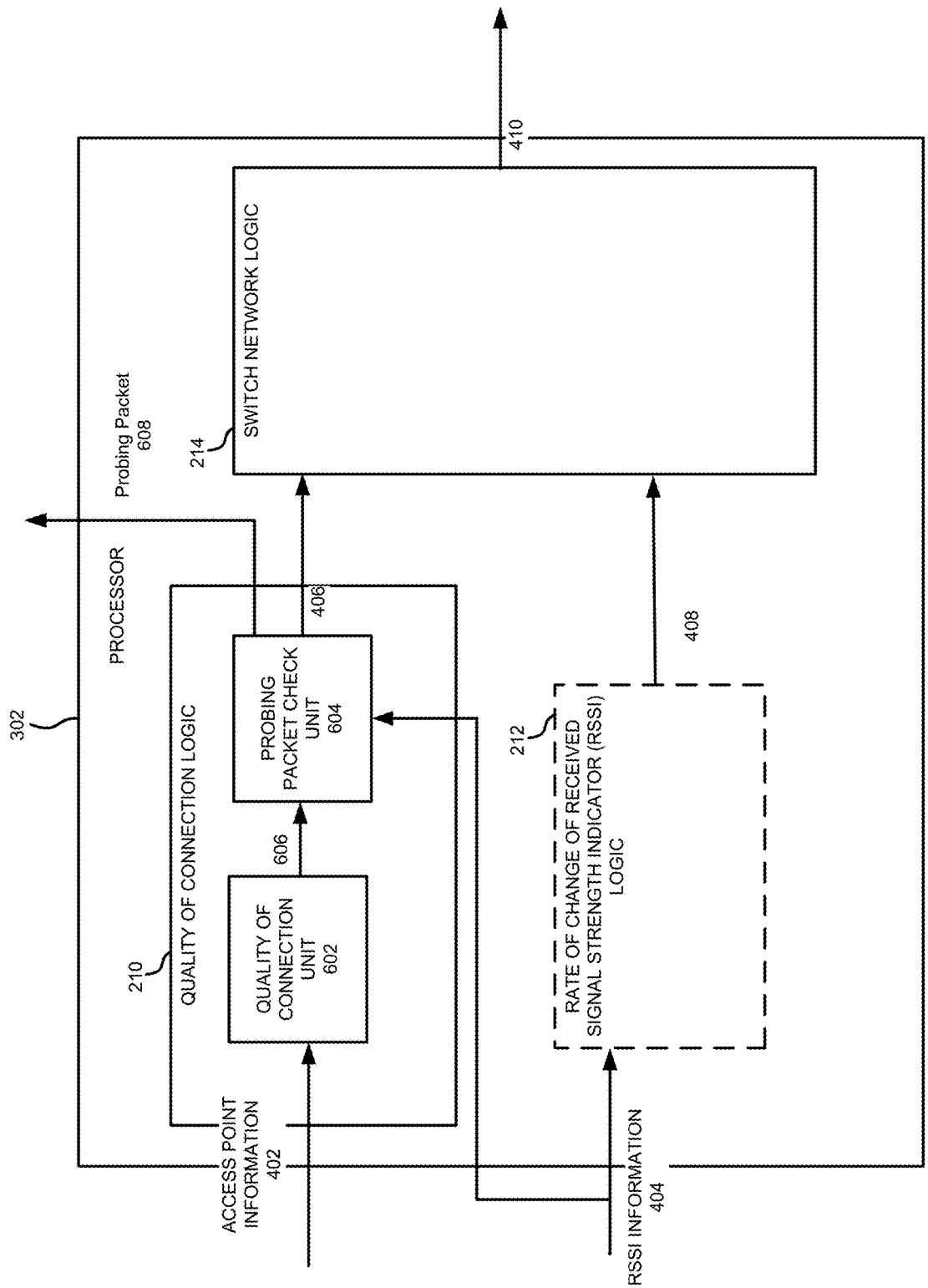
FIG. 6 is a block diagram illustrating a mobile device for proactively switching to a new network connection in accordance with one example set forth in the disclosure.
Figure 7:
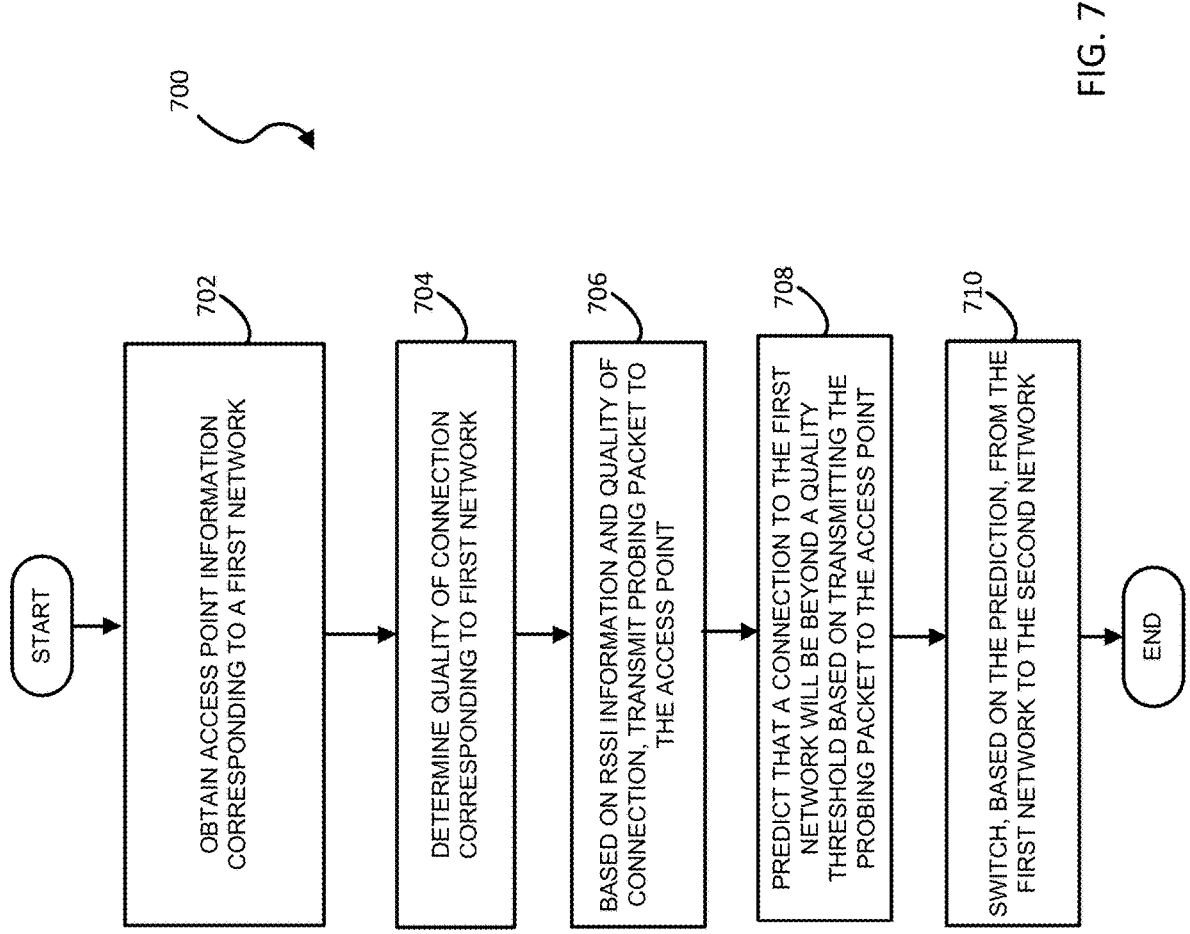
FIG. 7 is a flow chart illustrating one example of a method performed by a mobile device to proactively switch to a new network connection in accordance with one example set forth in the disclosure.

FIG. 6 is another block diagram illustrating the mobile device 102 that proactively switches to a new or second network. The logic 210 includes a quality of control unit 602 and a probing packet check unit 604. Although these sub-units 602 and 604 are illustrated as children units subordinate of the parent logic 210, each sub-unit can be operated as a separate unit from the parent logic, and other suitable combinations of sub-units are contemplated to suit different applications. For example, the probing packet check unit 604 can be included in the logic 214 instead of being included in the logic 210 as shown in FIG. 6. The functions of the logic 212 and 214 are described above. Additionally, and/or alternatively, the logic 212 and/or 214 are optional (e.g., the mobile device 102 proactively switches to a second network without using the functionalities of the logic 212 and/or 214). FIG. 6 will be described with reference to FIG. 7. FIG. 7 shows another flowchart of a method to proactively switch to a new or second network.

At step 702, the quality of connection (QOC) unit 602 obtains AP information corresponding to a first network, such as the first WiFi network 104, as described above. At step 704, the QOC unit 602 determines the quality of connection (e.g., data is flowing, acceptable, barely, and/or not flowing) corresponding to the first network. For example, the QOC unit 602 determines the quality of connection for the first WiFi network 104 over a period of time as described above, and continuously determines new quality of connections for the first WiFi network 104. The QOC unit 602 provides information 606 (e.g., information indicating the quality of connection) to the probing packet check unit 604. The probing packet check unit 604 also obtains the RSSI information 404 indicating the current RSSI of the first WiFi AP 106. The RSSI information 404 is described above. The probing packet check unit 604 compares the RSSI of the first WiFi AP 106 with an RSSI threshold value (e.g., a pre-determined and/or pre-programmed RSSI threshold value).

At step 706, based on the RSSI information and the quality of connection for the first network, the probing packet check unit 604 transmits one or more probing packets 608 to the first AP (e.g., the first WiFi AP 106). For example, if the RSSI of the first WiFi AP 106 is below the RSSI threshold and quality of connection indicates that data is not flowing and/or barely flowing between the mobile device 102 and the first WiFi AP 106, the probing packet check unit 604 performs a probing packet check and transmits a probing packet to the first WiFi AP 106 via the communications unit 208. Based on the transmission, the probing packet check unit 604 determines whether the transmission and/or reception of the probing packet is successful between the mobile device 102 and the first WiFi AP 106. For example, for a successful transmission, the first WiFi AP 106 receives the probing packet, and transmits a response packet back to the mobile device 102. If the mobile device 102 receives the response packet from the first WiFi AP 106, then the probing packet check unit 604 determines that the probing packet check is successful. If the transmission and/or reception of the probing packet is unsuccessful (e.g., no response packet received from the first WiFi AP 106), the probing packet check unit 604 determines the probing packet check is unsuccessful. The probing packet check unit 604 provides information 406 (e.g., whether the probing packet check is successful and/or the quality of connection) to the switch network logic 214.

In some examples, the probing packet check unit 604 transmits one or more probing packets to the first WiFi AP 106 at one or more transmission rates. The probing packet check unit 604 uses the probing packets at the multiple different transmission rates to predict whether the connection between the first WiFi AP 106 and the mobile device 102 will be beyond the quality threshold. For example, the probing packet check unit 604 transmits a probing packet at the most reliable transmission rate. When there is no successful reception from the first WiFi AP 106 at the most reliable transmission rate, the probing packet check unit 604 determines that the connection between the first WiFi AP 106 and the mobile device 102 will be beyond the quality threshold.

At step 708, the logic 214 predicts that a connection to the first network will be beyond the quality threshold based on transmitting the probing packet to the AP, such as the first WiFi AP 106. For example, if the probing packet check fails, the logic 214 determines the first network will be beyond the quality threshold. At step 710, the logic 214 switches from the first network to the second network based on the prediction at step 708.

In some instances, as described above, the functionalities of the logic 212 described above and/or below are included to the method 700. For example, in at least one example, referring to step 506, the logic 214 uses the probing packet check, the rate of change of the RSSI (e.g., from step 504), and/or the quality of connection (e.g., from step 502) to predict whether the connection to the first network will be beyond the quality threshold and/or whether to switch from the first network to the second network.

Figure 8:
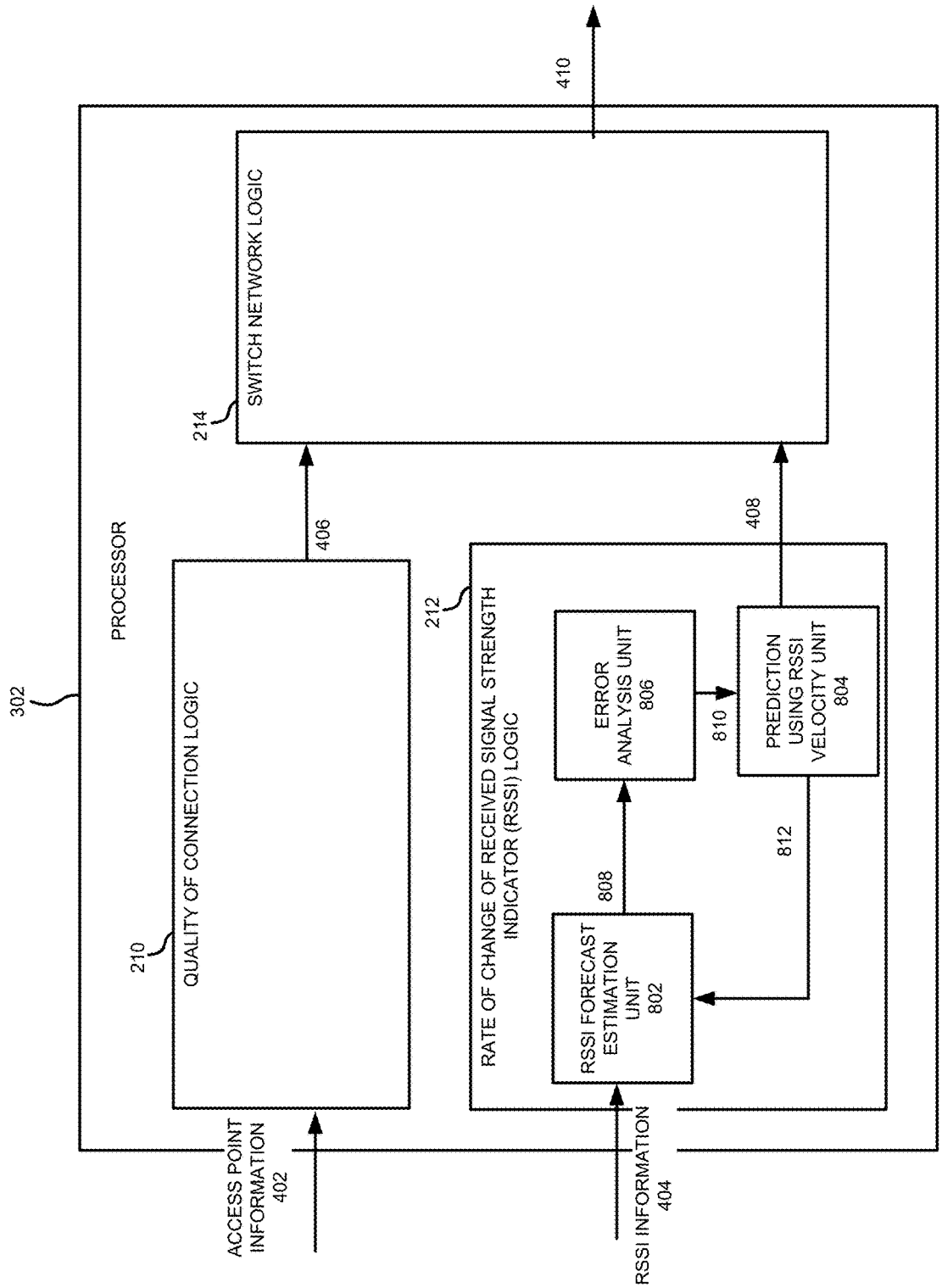
FIG. 8 is a block diagram illustrating a mobile device for proactively switching to a new network connection in accordance with one example set forth in the disclosure.
Figure 9:
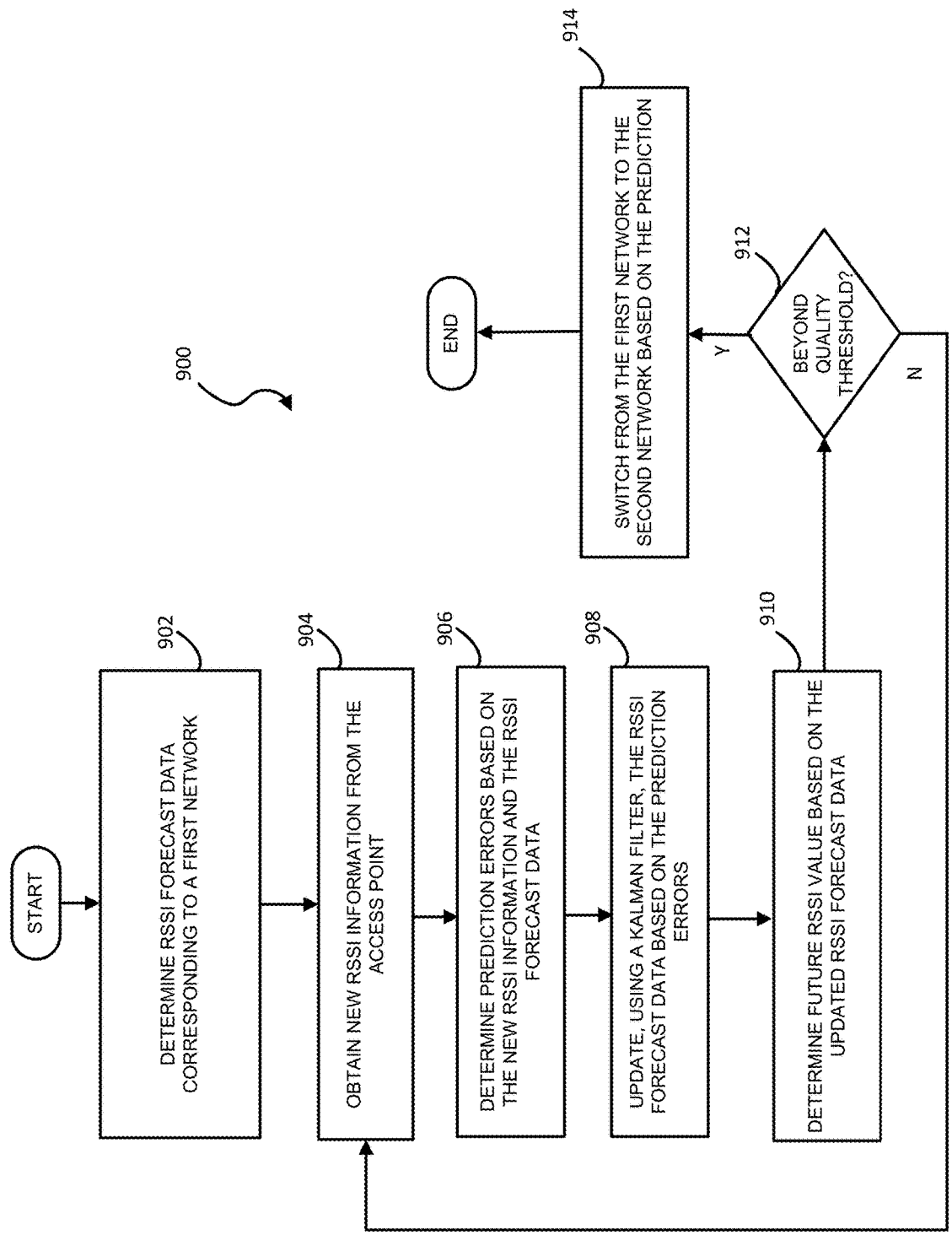
FIG. 9 is a flow chart illustrating one example of a method performed by a mobile device to proactively switch to a new network connection in accordance with one example set forth in the disclosure.

FIG. 8 is another block diagram illustrating the mobile device 102 that proactively switches to a new or second network. The logic 212 includes an RSSI forecast estimation unit 802, a prediction using RSSI velocity unit 804, and an error analysis unit 806. Although these sub-units 802, 804, and 806 are illustrated as children units subordinate of the parent logic 212, each sub-unit can be operated as a separate unit from the parent logic, and other suitable combinations of sub-units are contemplated to suit different applications. The functionalities of the logic 210 and 214 are described above. Additionally, and/or alternatively, the logic 210 and/or 214 is optional (e.g., the mobile device 102 proactively switches to a second network without using the functionalities of the logic 210 and/or 214). For example, FIG. 8 will be described below without the functionalities of the logic 210. However, the functionalities of the logic 210 may be included within FIG. 8. For instance, in at least one example, the mobile device uses logic 210 to predict whether a connection to the first network will be beyond the quality threshold based on the quality of connection of the first network as described above. FIG. 8 will be described with reference to FIG. 9. FIG. 9 shows another flowchart of a method to proactively switch to a new or second network.

As explained below, in some examples, the logic 212 uses observed RSSI measurements and a Kalman Filter to proactively switch to the second network. For example, a Kalman Filter uses a series of observed measurements (e.g., RSSI measurements) and one or more current estimated states (e.g., RSSI forecast data) to predict a future state and/or a predicted (e.g., future) value for the system. Once the future state is observed, the Kalman Filter determines errors between the predicted future state and the observed future state, and updates the model accordingly. Then, in the next iteration, the Kalman Filter uses the updated model to predict another future state of the system, and the process repeats.

In operation, at step 902, the RSSI forecast estimation unit 802 determines RSSI forecast data (e.g., an estimated state) corresponding to a first network, such as the first WiFi network 104. For example, the RSSI forecast estimation unit 802 determines a linear model indicating the velocity of the RSSI, such as RSSI at time (N+M) sec=RSSI at time N sec+RSSI_velocity*M. N represents a variable, such as time. M indicates a period of time to update the model (e.g., if M is three seconds, then the rate of change of RSSI logic 212 updates the model every three seconds).

At step 904, the RSSI forecast estimation unit 802 obtains new (e.g., current) RSSI information 404, such as the current or most recent RSSI values and/or states corresponding to the first WiFi AP 106. The RSSI forecast estimation unit 802 provides information 808 (e.g., the linear model and/or the current RSSI information 404) to the error analysis unit 806.

At step 906, the error analysis unit 806 determines one or more prediction errors based on the new RSSI information and the RSSI forecast data (e.g., the previously estimated state, such as the linear model described at step 902). In other words, the error analysis unit 806 uses the RSSI forecast data, previous predicted RSSI values, and/or the current RSSI information to determine errors between the predicted state and the actual state. In some examples, the error analysis unit 806 determines errors based on comparing the current RSSI values from the new RSSI information with previously predicted RSSI values.

At step 908, the error analysis unit 806 updates, using a Kalman filter, the RSSI forecast data based on the prediction errors determined at step 906. The updated RSSI forecast data (e.g., an updated linear model) indicates one or more predicted future states for the first WiFi AP 106. For example, by determining the errors between the predicted state and the actual state, the error analysis unit 806 determines updated RSSI forecast data for the first WiFi AP 106. The error analysis unit 806 provides the RSSI forecast data to the prediction using RSSI velocity unit 804.

At step 910, the prediction using RSSI velocity unit 804 uses a Kalman Filter to determine a future RSSI value based on the updated RSSI forecast data. For example, the unit 804 uses the updated RSSI forecast data (e.g., the updated linear model) to predict (e.g., determine) the RSSI value at time (N+P) sec (e.g., a future RSSI value at future time N+P).

At step 912, the prediction using RSSI velocity unit 804 determines whether the connection to the first network will be beyond the quality threshold. For example, the unit 804 compares the future RSSI value from step 910 with an RSSI threshold (e.g., a pre-determined and/or pre-programmed threshold). If the future RSSI value is beyond (e.g., above or below) an RSSI threshold, then the unit 804 predicts (e.g., determines) that in P seconds (e.g., 15 seconds) the connection will be beyond the quality threshold. If the future RSSI value is not beyond than the RSSI threshold, then the unit 804 predicts that in P seconds the connection will not be beyond the quality threshold. If the unit 804 predicts that the connection will be beyond the quality threshold, the unit 804 provides information 408 (e.g., the connection will be beyond the quality threshold) to the logic 214. At step 914, as described above, the logic 214 switches, based on the prediction from step 910, from the first network to the second network.

If the unit 804 predicts that the connection to the first network will not be beyond the quality threshold, then the method 900 moves back to step 904. Then, the process repeats continuously from step 904 until the logic 212 predicts the connection will be beyond the quality threshold (e.g., the logic 212 obtains new RSSI information from the first WiFi AP 106, determines prediction errors based on the new RSSI information and the current RSSI forecast data, updates the current RSSI forecast data, and uses the updated RSSI forecast data to determine a new future RSSI value, and determine whether the future RSSI value is beyond a quality threshold).

In some examples, at step 902, the RSSI forecast estimation unit 802 determines RSSI data indicating a second order model (e.g., using acceleration), such as RSSI at time (N+M)sec=RSSI at time Nsec+RSSI_velocity*M+RSSI_acceleration*(½)M^2. The logic 212 uses the second order model to predict, update, and proactively switch from a first network to a second network.

In some variations, the logic 212 adapts (e.g., changes) the time, P, based on the prediction error. For example, if the difference (e.g., variance) between the predicted RSSI at time (N+P) sec and the actual observed RSSI at time (N+P) sec is larger than a threshold, then the logic 212 reduces the value of P (e.g., from 15 seconds to 10 seconds). Then, in the next iteration of method 900, the new P value is used to predict whether the first network will be beyond the quality threshold. In some instances, instead of using a Kalman Filter, the logic 212 uses different methods and/or other algorithms, such as moving averages, to predict whether the first network will be beyond the quality threshold.

Figure 10:
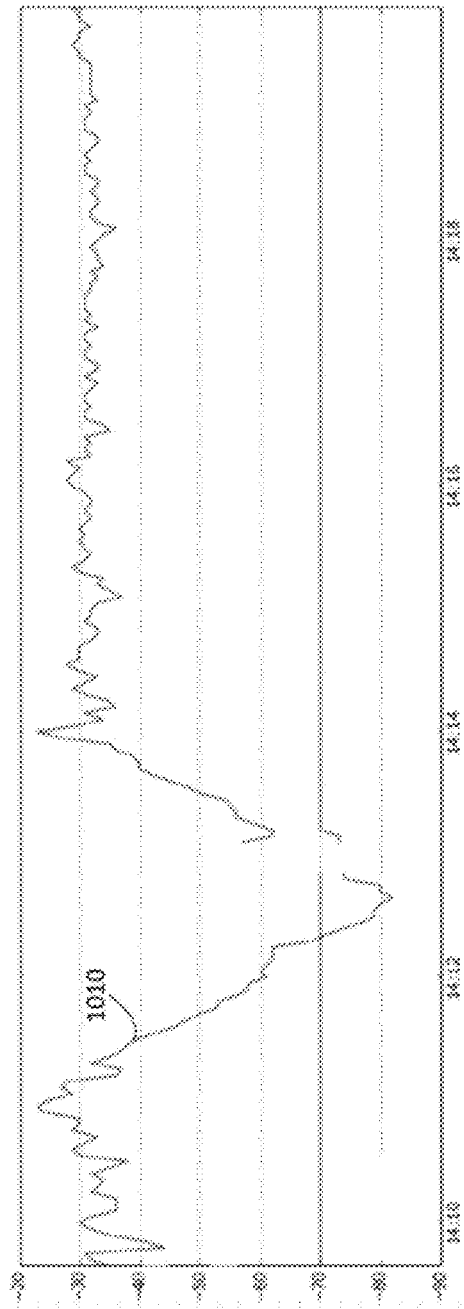
FIG. 10 is a graphical representation of example data of RSSI values in accordance with one example set forth in the disclosure.
Figure 10:
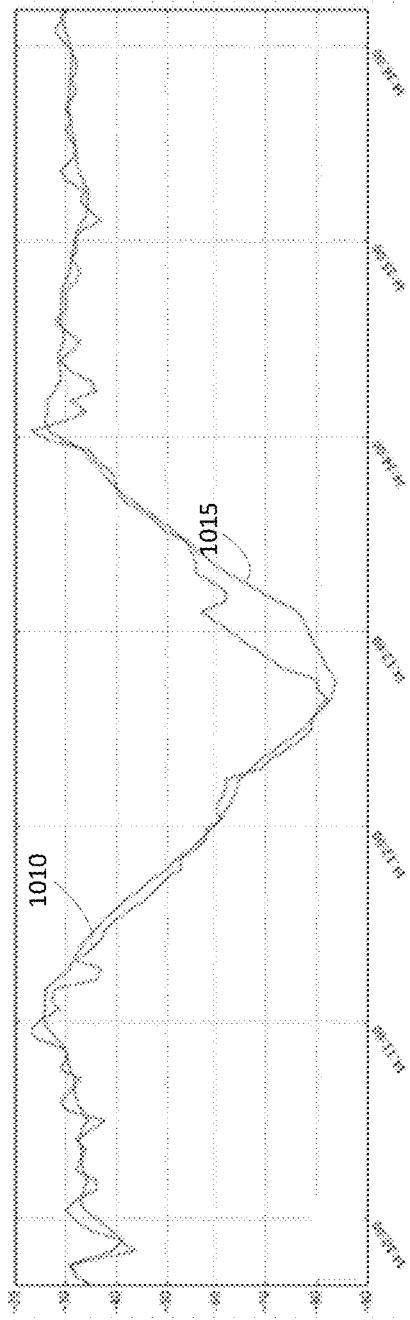
Figure 11:
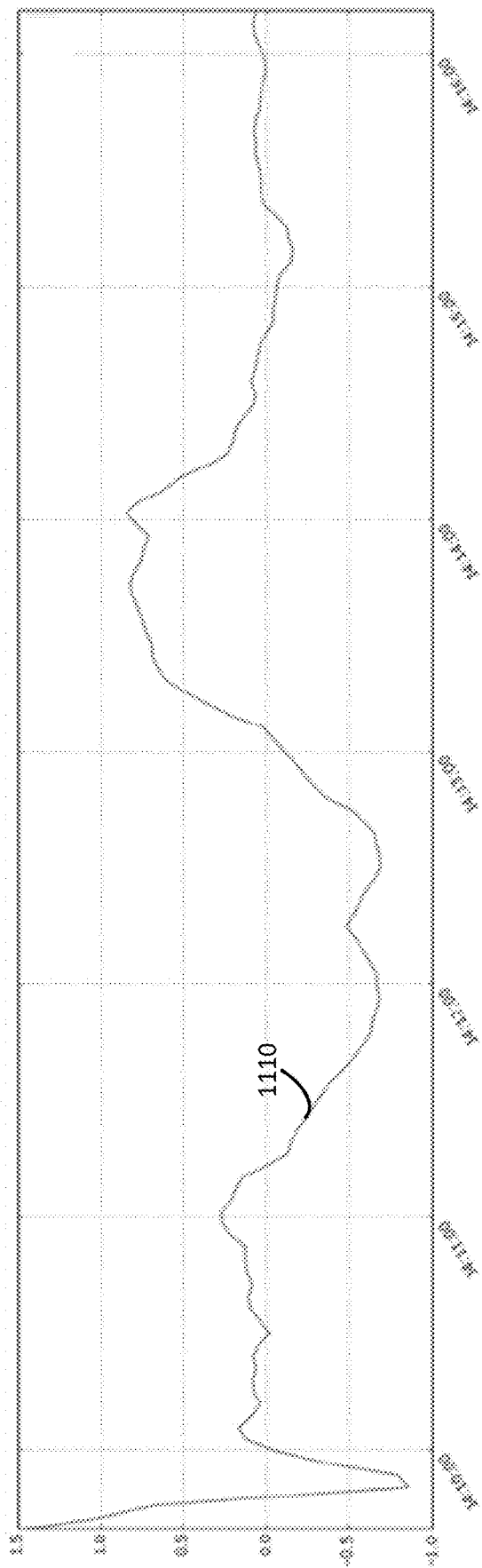
FIG. 11 is another graphical representation of an example data of RSSI velocity values in accordance with one example set forth in the disclosure.

FIGS. 10 and 11 shows graphs of observed RSSI values, RSSI forecast data, and velocity of the RSSI forecast data (e.g., determined using observed RSSI values and a Kalman Filter). For example, graph 1005 shows observed RSSI values 1010 over a period of time. For instance, a mobile device 102 and the first WiFi AP 106 is a similar distance away from each other for the first minute (e.g., 14:10). Then, the mobile device 102 is moved away from the first WiFi AP 106, and then back. However, there may be noise in the RSSI and incorporating a filter, such as a Kalman Filter is used to reduce the noise and proactively switch to a second network. Graph 1015 shows the observed RSSI values 1010, and also shows RSSI forecast data 1020.

Referring to FIG. 11, graph 1105 shows the velocity (e.g., derivative) from the RSSI forecast data 1110. In some examples, using the velocity from the RSSI forecast data 1110, the prediction using RSSI velocity unit 804 predicts whether the connection to the first network will be beyond the quality threshold, and when the connection will be beyond the quality threshold (e.g., at time P). Additionally, and/or alternatively, as mentioned above in FIGS. 4 and 5, the logic 212 and/or 214 uses the velocity from the RSSI forecast data 1110 to determine scores (e.g., Stationary, Wandering, Striding, Sprinting) and the quality of connection to predict that a connection to the first network will be beyond the quality threshold.

In some examples, prior to switching from the first network to the second network (e.g., prior to steps 508, 710, and/or 910), the logic 214 performs a further check (e.g., an enhance prediction reliability check) to avoid flipping between the first and second network. For example, the logic 214 compares the current RSSI for the first WiFi AP 106 with an entering threshold $RSSI_{enter}$. The $RSSI_{enter}$ is a threshold indicating whether to connect to a network. For example, a mobile device 102 connects to the web server 110 via the cellular network 112. Based on the mobile device 102 determining the RSSI for the first WiFi AP 106 is above the $RSSI_{enter}$, then the mobile device 102 switches to the first WiFi AP 106. Furthermore, prior to switching from the first network to the second network, the logic 212 performs a further check to determine if the current RSSI for the first WiFi AP 106 is above $RSSI_{enter}$ for the first WiFi AP 106. The logic 214 stays with the first WiFi network 104 if current RSSI value for the first WiFi AP 106 is above the $RSSI_{enter}$ value.

In some instances, the logic 214 performs a further check to check the number of successful transmissions and/or receptions between the mobile device 102 and the first WiFi AP 106. If the logic 214 determines the number of successful transmissions and receptions recently are above a threshold, then logic 214 does not switch to the second network.

In some variations, the logic 212 adjusts the $RSSI_{leave}$. The $RSSI_{leave}$ is a threshold RSSI value indicating when the mobile device 102 should leave the first network for a second network due to a poor internet connection. For example, initially the mobile device 102 sets the $RSSI_{leave}$ to the same value as the $RSSI_{enter}$. Then, referring to step 906 on FIG. 9, the logic 212 reduces the RSSI threshold (e.g., the $RSSI_{leave}$) when the predicted RSSI value (e.g., RSSI at time (N+P) sec) is close to the $RSSI_{leave}$ and the transmission success rate (e.g., number of succession transmissions/total number of transmissions) is greater than a threshold. Additionally, and/or alternatively, the logic 212 reduces the $RSSI_{leave}$ by setting the $RSSI_{leave}$=min ($SSI_{leave}$, $RSSI_{check}$).

By using the above methods and components, the mobile device 102 proactively switches to a second network prior to a data stall between the first connection and the mobile device 102. As such, the mobile device 102 is able to prevent poor and/or loss of network connectivity by proactively switching to a second network. Further, by the mobile device 102 performing one or more of the methods describes above, an additional network load (e.g., a load at the first WiFi AP 106) is prevented. Additionally, and/or alternatively, by the mobile device 102 performing one or more of the methods describes above, the mobile device 102 avoids switching to a new network too early. Switching to a new network causes thrashing between the network types. Further, switches are also expensive since they require re-establishing the end-to-end connections for application data (e.g., for stream based protocols).

In various embodiments, executable suitable instructions may be stored on a non-transitory computer readable storage medium, where the executable instructions are executable by one or more processors to cause the one or more processors to perform the actions described herein. Referring back to FIG. 2, in some examples, the memory 204 stores executable instructions to be executed by the mobile device 102. The memory 204 is any suitable memory, such as RAM, non-volatile memory (e.g., ROM, flash memory, EPROM, EEPROM, etc.), a disk storage device, or any other suitable memory that may store executable instructions. Some or all of this functionality may also be implemented in any other suitable manner such as, but not limited to, a software implementation including, for example, a driver implementation, a firmware implementation, a hardware implementation, or any suitable combination of the example implementations described above.

In situations in which the methods and systems discussed herein may collect personal information about users, or may make use of personal information (e.g., user data), users are provided with one or more opportunities to control how information is collected about the user and used in one or more described features. A user is provided with control over whether programs or features collect user data (e.g., information about a user's social network, user characteristics (age, gender, profession, etc.), social actions or activities, a user's preferences, content created or submitted by a user, a user's current geographic location, etc.). A user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more control options over a communication network. In addition, certain data may be treated in one or more ways before it is stored or used, so that personally identifiable information is removed. For example, a user's identity may be treated so that no personally identifiable information can be determined for the user, or a user's geographic location may be generalized to a larger region so that a particular location of a user cannot be determined.

In the preceding detailed description, reference has been made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. It is therefore contemplated that the present invention covers any and all modifications, variations or equivalents that fall within the spirit and scope of the basic underlying principles disclosed above and claimed herein

What is claimed is:

1. A method for switching between network connections for a mobile device comprising:
   determining, by the mobile device, a quality of connection corresponding to a first network provided by an access point, the quality of connection based on a quantity of packets transmitted to or received from the first network via the access point;
   determining, by the mobile device, a rate of change of a received signal strength indication (RSSI) corresponding to the first network;
   predicting, by the mobile device, that a connection to the first network will be beyond a quality threshold at a specific instance in time in the future based on the rate of change and the quality of connection; and
   based on the predication that the connection to the first network will be beyond the quality threshold at the specific instance in time in the future, switching, by the mobile device, from the first network to a second network before the specific instance in time in the future,
   wherein predicting that the connection to the first network will be beyond the quality threshold comprises:
      determining a signal-velocity classification based on the rate of change of the RSSI, the signal-velocity classification corresponding to a rank in a hierarchy of signal-strength change rates;
      determining whether the rate of change of the RSSI is positive or negative;
      determining a connection-quality classification based on the quality of connection, the connection-quality classification corresponding to a rank in a hierarchy of connection qualities;
      determining a quality score based on the signal-velocity classification, the connection-quality classification, and whether the rate of change of the RSSI is positive or negative; and
      comparing the quality score to a quality-score threshold.

2. The method of claim 1, wherein determining the quality of connection is based on a number of successful packet transmissions or a number of failed packet transmissions or a number of successful packet receptions.

3. The method of claim 1, wherein determining the rate of change of the RSSI corresponding to the first network comprises determining RSSI forecast data indicating a linear model of the RSSI corresponding to the first network.

4. The method of claim 3, wherein predicting that the connection to the first network will be beyond the quality threshold further comprises:
   predicting, using a Kalman Filter and the linear model of the RSSI, an RSSI value at the specific instance in time in the future; and
   determining that the connection to the first network will be beyond the quality threshold based on comparing the RSSI value at the specific instance in time in the future with an RSSI threshold.

5. The method of claim 3, wherein determining the rate of change of the RSSI corresponding to the first network further comprises:
   determining a prediction error based on a current RSSI value and a predicted RSSI value, wherein the predicted RSSI value is determined using a Kalman Filter; and
   updating, using the Kalman Filter, the linear model of the RSSI based on the prediction error.

6. The method of claim 5, wherein predicting that the connection to the first network will be beyond the quality threshold further comprises:
   predicting, using the updated linear model of the RSSI, an RSSI value at the specific instance in time in the future; and
   determining that the connection to the first network will be beyond the quality threshold based on comparing the RSSI value at the specific instance in time in the future with an RSSI threshold.

7. The method of claim 1, wherein switching from the first network to the second network comprises switching from a WiFi network to a cellular network.

8. The method of claim 1, further comprising:
   transmitting, to the access point, a probing packet based on the rate of change of the RSSI and the quality of connection, and
   wherein the predicting that the connection to the first network is beyond the quality threshold is based on the transmitting the probing packet.

9. The method of claim 1, further comprising:
   performing a prediction reliability check to avoid flipping between the first network and the second network, and
   wherein the switching from the first network to the second network based on performing the prediction reliability check.

10. The method of claim 9, wherein performing the prediction reliability check comprises comparing a current RSSI for the first network with an RSSI threshold.

11. The method of claim 1, wherein determining the rate of change of the RSSI corresponding to the first network comprises determining RSSI forecast data indicating a second order model of the RSSI corresponding to the first network.

12. The method of claim 1, wherein the hierarchy of connection qualities comprises: (i) normal data flow; (ii) most data packets transmitted and received; (iii) very few data packets transmitted and received; and (iv) no data packets transmitted and received; and the hierarchy of signal-strength change rates comprises: (i) less than about 0.2%; (ii) between about 0.2-1%; (iii) between about 0.2-4%; and (iv) greater than about 4%.

13. A method for switching between network connections for a mobile device, the method comprising:
   determining, by the mobile device, a rate of change of a received signal strength indication (RSSI) corresponding to a first network provided by an access point based on obtained RSSI information;
   predicting, by the mobile device, a specific instance in time in the future when a connection to the first network will be beyond a quality threshold based on the rate of change of the RSSI at the specific instance in time in the future; and
   based on the prediction that the connection to the first network will be beyond the quality threshold at the specific instance in time in the future, switching, by the mobile device, from the first network to a second network before the specific instance in time,
   wherein predicting that the connection to the first network will be beyond the quality threshold comprises:
      determining a signal-velocity classification based on the rate of change of the RSSI, the signal-velocity classification corresponding to a rank in a hierarchy of signal-strength change rates;
      determining whether the rate of change of the RSSI is positive or negative;
      determining a connection-quality classification based on the quality of connection, the connection-quality classification corresponding to a rank in a hierarchy of connection qualities;
      determining a quality score based on the signal-velocity classification, the connection-quality classification, and whether the rate of change of the RSSI is positive or negative; and
      comparing the quality score to a quality-score threshold.

14. The method of claim 13, wherein determining the rate of change of the RSSI corresponding to the first network comprises determining RSSI forecast data indicating a linear model of the RSSI corresponding to the first network.

15. The method of claim 14, wherein predicting the specific instance in time in the future when the connection to the first network will be beyond the quality threshold further comprises:
   predicting, using a Kalman Filter and the linear model of the RSSI, an RSSI value at the specific instance in time in the future; and
   determining that the connection to the first network will be beyond the quality threshold based on comparing the RSSI value at the specific instance in time in the future with an RSSI threshold.

16. The method of claim 14, wherein determining the rate of change of the RSSI corresponding to the first network further comprises:
   determining a prediction error based on a current RSSI value and a predicted RSSI value, wherein the predicted RSSI value is determined using a Kalman Filter; and
   updating, using the Kalman Filter, the linear model of the RSSI based on the prediction error.

17. The method of claim 16, wherein predicting that the connection to the first network will be beyond the quality threshold further comprises:
   predicting, using the updated linear model, an RSSI value at the specific instance in time in the future; and
   determining that the connection to the first network will be beyond the quality threshold based on comparing the RSSI value at the specific instance in time in the future with an RSSI threshold.

18. The method of claim 13, wherein switching from the first network to the second network comprises switching from a WiFi network to a cellular network.

19. The method of claim 13, wherein determining the rate of change of the RSSI corresponding to the first network comprises determining RSSI forecast data indicating a second order model of the RSSI corresponding to the first network.

20. A mobile device comprising:
   a communications unit; and
   logic, operatively coupled to the communications unit, that is configured to:
      determine a rate of change of a received signal strength indication (RSSI) corresponding to a first network provided by an access point;
      predict, based on the rate of change, a specific instance in time in the future when a connection to the first network will be beyond a quality threshold; and
      based on the prediction that the connection to the first network will beyond the quality threshold at the specific instance in time in the future, switch, using the communications unit, from the first network to a second network before the specific instance in time,
   wherein the logic is configured to predict that the connection to the first network will be beyond the quality threshold by:
      determining a signal-velocity classification based on the rate of change of the RSSI, the signal-velocity classification corresponding to a rank in a hierarchy of signal-strength change rates;
      determining whether the rate of change of the RSSI is positive or negative;
      determining a connection-quality classification based on the quality of connection, the connection-quality classification corresponding to a rank in a hierarchy of connection qualities;
      determining a quality score based on the signal-velocity classification, the connection-quality classification, and whether the rate of change of the RSSI is positive or negative; and
      comparing the quality score to a quality-score threshold.

21. The mobile device of claim 20, wherein the logic is further configured to determine the rate of change of the RSSI corresponding to the first network by determining RSSI forecast data indicating a linear model of the RSSI corresponding to the first network.

22. The mobile device of claim 21, wherein the logic is further configured to predict the specific instance in time in the future when the connection to the first network will be beyond the quality threshold by:
  predicting, using a Kalman Filter and the linear model of the RSSI, an RSSI value at the specific instance in time in the future; and
  determining that the connection to the first network will be beyond the quality threshold based on comparing the RSSI value at the specific instance in time in the future with an RSSI threshold.

23. The mobile device of claim 21, wherein the logic is further configured to determine the rate of change of the RSSI corresponding to the first network by:
  determining a prediction error based on a current RSSI value and a predicted RSSI value, wherein the predicted RSSI value is determined using a Kalman Filter; and
  updating, using the Kalman Filter, the linear model of the RSSI based on the prediction error.

24. The mobile device of claim 23, wherein the logic is further configured to predict the specific instance in time in the future when the connection to the first network will be beyond the quality threshold by:
  predicting, based on the updated linear model of the RSSI, an RSSI value at the specific instance in time in the future; and
  determining that the connection to the first network will be beyond the quality threshold based on comparing the RSSI value at the specific instance in time in the future with an RSSI threshold.

25. The mobile device of claim 20, wherein the logic is further configured to switch from the first network to the second network by switching from a WiFi network to a cellular network.

26. The mobile device of claim 20, wherein the logic is further configured to switch from the first network to the second network by switching from a first WiFi network to a second WiFi network.

27. The mobile device of claim 20, wherein the logic is further configured to:
  determine a quality of connection corresponding to the first network, the quality of connection based on a quantity of packets transmitted to and/or received from the first network via the access point, and
  wherein the logic is further configured to predict the specific instance in time in the future when the connection to the first network will be beyond the quality threshold based on the quality of connection.

28. The mobile device of claim 27, wherein the logic determines the quality of connection based on a number of successful packet transmissions or a number of failed packet transmissions or a number of successful packet receptions.

29. The mobile device of claim 27, wherein the logic is further configured to:
  transmit, to the access point, a probing packet based on the rate of change of the RSSI and the quality of connection, and
  wherein the logic predicts that the connection to the first network is beyond the quality threshold based on transmitting the probing packet.

30. The mobile device of claim 27, wherein the logic is further configured to:
  perform a prediction reliability check to avoid flipping between the first network and the second network, and
  wherein the logic is configured to switch from the first network to the second network based on performing the prediction reliability check.

31. The mobile device of claim 20, wherein the logic comprises:
  one or more processors; and
  memory comprising instructions that, when executed by the one or more processors, causes the one or more processors to:
    determine the rate of change of the received signal strength indication (RSSI) corresponding to the first network;
    predict, based on the rate of change, that the connection to the first network will be beyond the quality threshold; and
    switch, using the communications unit, from the first network to the second network based on the prediction.

* * * * *